(12) United States Patent
Mere

(10) Patent No.: US 10,847,043 B2
(45) Date of Patent: Nov. 24, 2020

(54) METHOD AND DEVICE FOR ASSISTING IN THE PILOTING OF AN AIRCRAFT IN AN APPROACH TO A LANDING RUNWAY WITH A VIEW TO A LANDING

(71) Applicant: Airbus Operations (S.A.S.), Toulouse (FR)

(72) Inventor: Jean-Claude Mere, Verfeil (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 16/707,346

(22) Filed: Dec. 9, 2019

(65) Prior Publication Data

US 2020/0184835 A1    Jun. 11, 2020

(30) Foreign Application Priority Data

Dec. 10, 2018 (FR) ..................... 18 72613

(51) Int. Cl.
*G08G 5/02* (2006.01)
*B64D 43/00* (2006.01)

(52) U.S. Cl.
CPC ............... *G08G 5/02* (2013.01); *B64D 43/00* (2013.01)

(58) Field of Classification Search
CPC .................. G08G 5/02; B64D 43/00
See application file for complete search history.

(56) References Cited

U.S. PATENT DOCUMENTS

| | | | | |
|---|---|---|---|---|
| 5,793,934 A | * | 8/1998 | Bauer | G05D 1/0274 |
| | | | | 700/250 |
| 5,798,733 A | * | 8/1998 | Ethridge | G01C 21/20 |
| | | | | 342/357.34 |
| 6,061,630 A | * | 5/2000 | Walgers | G01C 21/3415 |
| | | | | 340/988 |

(Continued)

FOREIGN PATENT DOCUMENTS

| | | |
|---|---|---|
| EP | 2 161 540 A1 | 3/2010 |
| GB | 912 214 A | 12/1962 |
| JP | 2013-124911 A | 6/2013 |

OTHER PUBLICATIONS

French Search Report for Application No. 1872613 dated Sep. 20, 2019.

(Continued)

*Primary Examiner* — Nay Tun
(74) *Attorney, Agent, or Firm* — Jenkins, Wilson, Taylor & Hunt, P.A.

(57) ABSTRACT

A method and device for assisting in piloting of an aircraft in approach to a landing runway with a view to a landing, including a module for determining current state of the aircraft, a module for determining distance between a target state and current state from an approach strategy and an ellipse formed by points determined such that a sum of a distance between the current position of the aircraft and the points of the ellipse and of a distance between the points of the ellipse and a projection of the target position on a horizontal plane of movement of the aircraft is equal to distance between target state and current state. The ellipse is displayed on a screen. The ellipse form gives indicates significance and variation of the energy surfeit of the aircraft. The pilot can decide on actions to maneuver the aircraft appropriately to dissipate the excess energy.

15 Claims, 4 Drawing Sheets

(56) References Cited

U.S. PATENT DOCUMENTS

| | | | | |
|---|---|---|---|---|
| 6,163,744 A * | 12/2000 | Onken | ............... | G01C 23/00 |
| | | | | 340/979 |
| 6,255,965 B1 * | 7/2001 | D'Orso | ............... | G01C 23/005 |
| | | | | 340/946 |
| 6,571,166 B1 * | 5/2003 | Johnson | ............... | G08G 5/0021 |
| | | | | 340/972 |
| 8,125,352 B2 * | 2/2012 | Dubourg | ............... | G08G 5/0086 |
| | | | | 340/947 |
| 8,224,508 B2 | 7/2012 | Bacabara et al. | | |
| 9,221,355 B2 * | 12/2015 | Kuhn | ............... | B60L 11/1861 |
| 9,469,414 B2 * | 10/2016 | Meunier | ............... | G08G 5/02 |
| 9,527,601 B2 * | 12/2016 | Wyatt | ............... | G08G 5/0021 |
| 9,731,153 B2 * | 8/2017 | Goda | ............... | F41G 9/002 |
| 9,997,078 B2 * | 6/2018 | Gadgil | ............... | G08G 5/0078 |
| 2010/0063655 A1 * | 3/2010 | Bacabara | ............... | G01C 21/00 |
| | | | | 701/16 |
| 2014/0222257 A1 * | 8/2014 | Wyatt | ............... | G08G 5/02 |
| | | | | 701/16 |
| 2018/0009546 A1 * | 1/2018 | Filias | ............... | G08G 5/0021 |

OTHER PUBLICATIONS

European Search Report for Application No. 19203974.1 dated Jan. 13, 2020.

* cited by examiner

METHOD AND DEVICE FOR ASSISTING IN THE PILOTING OF AN AIRCRAFT IN AN APPROACH TO A LANDING RUNWAY WITH A VIEW TO A LANDING

CROSS-REFERENCE TO RELATED APPLICATION

This application claims the benefit of and priority to French patent application number 18 72613 filed on Dec. 10, 2018, the entire disclosure of which is incorporated by reference herein.

TECHNICAL FIELD

The disclosure herein relates to a method and a device for assisting in the piloting of an aircraft in an approach phase of the aircraft, with a view to a landing on the landing runway of an airport.

BACKGROUND

It is known that, in an approach phase, the crew of an aircraft, in particular of a transport airplane, must obtain, in accordance with international recommendations, a stabilized state of the aircraft at a point of stabilization of the approach, or FAF ("Final Approach Fix") which is generally set at 1000 feet (approximately 305 m) above the threshold of the landing runway.

To be in a stabilized state, the aircraft must be in a so-called landing configuration, the control of the thrust must be matched to the landing configuration, the vertical speed must not be excessive, and all the checks must be made. In this context, the landing configuration refers to the following situation: the landing gear is lowered, the flaps are extended in a landing position and the air brakes are retracted.

Currently, in a guided approach, in which the aircraft follows instructions from the air traffic controller, the crew of an aircraft has no reference of lateral or vertical trajectory towards the FAF point to indicate to it how to alter the altitude, the speed and the configuration of the aircraft and how to dissipate the energy of the aircraft appropriately as far as the landing runway. The crew has to manage the energy changes to the landing runway manually, based on high-level information such as the current altitude, the current speed, the direct distance to the point of stabilization of the approach, or to the FAF point. This information is difficult to interpret to decide what actions to undertake in terms of piloting to manage the residual energy of the aircraft evenly to the landing runway.

Thus, in a guided approach, the management of the energy in descent and in approach is these days left to the discretion of the crew of the aircraft which has to assess the energy situation of the aircraft and conduct appropriate piloting actions to manage any cases of energy surfeit or of energy deficit resulting from the instructions of air traffic control ATC. Indeed, these instructions, whose aim is to space apart the aircraft to ensure the safety of the air traffic, do not necessarily observe the capabilities or the performances of the aircraft and can lead to situations in which the aircraft finds itself in difficult conditions for finishing the approach nominally.

When the aircraft is stabilized, the crew ensures that the aircraft remains at a so-called approach speed and monitors any loss of stability until the aircraft reaches the runway threshold. If the aircraft is not stabilized at the stabilization point, or becomes unstable, the crew must initiate a go-around with a failure of the approach procedure.

Consequently, if the crew applies a rate of energy loss that is excessive, the aircraft will have to use a surplus of fuel to be able to reach the target stabilization point at the right speed.

On the other hand, if an inadequate rate of energy loss is applied to the aircraft, it will reach the target stabilization point with excessive energy and will be forced to initiate a go-around with a failure of the approach procedure.

Consequently, such a standard management of the loss of energy of the aircraft on approach during the landing phase is not therefore fully satisfactory, notably for reasons of workload of the crew and non-optimal accuracy.

SUMMARY

An object of the disclosure herein is to remedy this drawback. It relates to a method for assisting in the piloting of an aircraft in an approach of the aircraft, with a view to a landing on a landing runway.

According to the disclosure herein, the method comprises the following steps implemented iteratively:

a first determination step, implemented by a first determination module, consisting in or comprising determining a current state of the aircraft, the current state comprising at least one current position of the aircraft;

a second determination step, implemented by a second determination module, consisting in or comprising determining a first distance between a target state and the current state from a first approach strategy;

a third determination step, implemented by the second determination module, consisting in or comprising determining a first ellipse contained in a horizontal plane in which the aircraft is moving, the first ellipse being formed by points determined in such a way that a sum, on the one hand, of a distance between the current position of the aircraft and the points of the first ellipse and, on the other hand, of a distance between the points of the first ellipse and a projection on the horizontal plane of the target position is equal to the first distance;

a display step, implemented by a display module, comprising the display of at least the first ellipse on a screen of the display module.

Thus, by virtue of the disclosure herein, a simple indication allows the pilot to have an estimation of the energy surfeit of the aircraft in an approach procedure according to an approach strategy with a view to a landing on a landing runway. In effect, the form of the ellipse gives an indication as to the significance of the energy surfeit of the aircraft. The variation of the form of the ellipse gives an indication as to the variation of the energy surfeit to be dissipated. The pilot can then decide on actions to be undertaken to maneuver the aircraft appropriately in order to dissipate the excess energy.

In the context of the disclosure herein, the first ellipse has a first focal point and a second focal point, the first focal point corresponding to the current position of the aircraft and the second focal point corresponding to the projection of the target position on the horizontal plane, the first ellipse having also a great axis and a small axis, the great axis being equal to the first distance, the display step further comprising the display of the first focal point and of the second focal point.

According to a first variant embodiment, the method comprises a fourth determination step, implemented by the second determination module, consisting in or comprising determining a point of intersection between the first ellipse and a projection of an axis of the landing runway, the display step further comprising the display of the point of intersection on the screen of the display module.

According to a second variant embodiment, the display step further comprises the display of a first segment between the first focal point and the point of intersection and of a second segment between the point of intersection and the second focal point.

According to a third variant embodiment, the method comprises a fifth determination step, implemented by the second determination module, consisting in or comprising determining a heading setpoint from the point of intersection, the display step further comprising the display of the heading setpoint on a heading scale.

According to a fourth variant embodiment, the method comprises a sixth determination step, implemented by the second determination module, consisting in or comprising determining a count-down corresponding to a time remaining to be travelled by the aircraft between the current position of the aircraft and the point of intersection while the aircraft follows the heading setpoint, the display step further comprising the display of the count-down.

According to a fifth variant embodiment, the method comprises a seventh determination step, implemented by the second determination module, consisting in or comprising determining a distance corresponding to a distance remaining to be travelled by the aircraft between the current position of the aircraft and the point of intersection while the aircraft follows the heading setpoint, the display step further comprising the display of the distance to be travelled.

According to a sixth variant embodiment, the method comprises an eighth determination step, implemented by the second determination module, consisting in or comprising determining a rate of descent from a relative variation of the first distance with respect to the distance between the current position and the target position, the display step further comprising the display of the rate of descent on a vertical speed scale.

According to a seventh variant embodiment, the method comprises a ninth determination step, implemented by the second determination module, consisting in or comprising determining an optimal rejoining trajectory towards the target position if the aircraft has a current trajectory which diverges from the axis of the landing runway, the optimal rejoining trajectory having a distance equal to the first distance, the optimal rejoining trajectory passing through a point of intersection between the first ellipse and the current trajectory, the display step further comprising the display of the optimal rejoining trajectory.

According to an eighth variant embodiment, the method comprises:
a tenth determination step, implemented by a third determination module, consisting in or comprising determining a second distance between the target state and the current state based on a second approach strategy;
an eleventh determination step, implemented by the third determination module, consisting in or comprising determining a second ellipse contained in the horizontal plane in which the aircraft is moving, the second ellipse being formed by points determined in such a way that a sum, on the one hand, of a distance between the current position of the aircraft and the points of the second ellipse and, on the other hand, of a distance between the points of the second ellipse and a projection on the horizontal plane of the target position is equal to the second distance; the display step further comprising the display of the second ellipse.

According to a ninth variant embodiment, the method comprises a twelfth determination step, implemented by the second determination module, consisting in or comprising determining an energy surfeit of the aircraft with respect to a predicted energy according to the first strategy, the energy surfeit being determined as a function of the dimension of the small axis of the ellipse, an energy gauge being determined from the energy surfeit,
the display step further comprising the display of the energy gauge.

According to a tenth variant embodiment, the method comprises a thirteenth determination step, implemented by the second determination module, consisting in or comprising determining an energy surfeit of the aircraft with respect to a predicted energy according to the first strategy, the energy surfeit being determined as a function of the dimension of the small axis of the ellipse, a numeric indication representative of the energy surfeit being determined from the energy surfeit,
the display step further comprising the display of the numeric indication.

The disclosure herein relates also to a device for assisting in the piloting of an aircraft in an approach of the aircraft, with a view to a landing on a landing runway.

According to the disclosure herein, the device comprises:
a first determination module configured to determine a current state of the aircraft, the current state comprising at least one current position of the aircraft;
a second determination module configured to:
determine a first distance between a target state and the current state from a first approach strategy;
determine a first ellipse contained in a horizontal plane in which the aircraft is moving, the first ellipse being formed by points determined in such a way that a sum, on the one hand, of a distance between the current position of the aircraft and the points of the first ellipse and, on the other hand, of a distance between the points of the first ellipse and a projection on the horizontal plane of the target position is equal to the first distance;
a display module comprising a screen, the display module being configured to display at least the first ellipse on the screen.

Moreover, the second determination module is configured to determine a point of intersection between the first ellipse and a projection of an axis of the landing runway.

The disclosure herein relates also to an aircraft, in particular a transport aeroplane, which is provided with a piloting assistance device such as that described above.

BRIEF DESCRIPTION OF THE DRAWINGS

The features of the disclosure herein mentioned above, and others, will become more clearly apparent on reading the following description of an exemplary embodiment, the description being given in relation to the attached, example drawings, in which.

DETAILED DESCRIPTION

Figure 1:
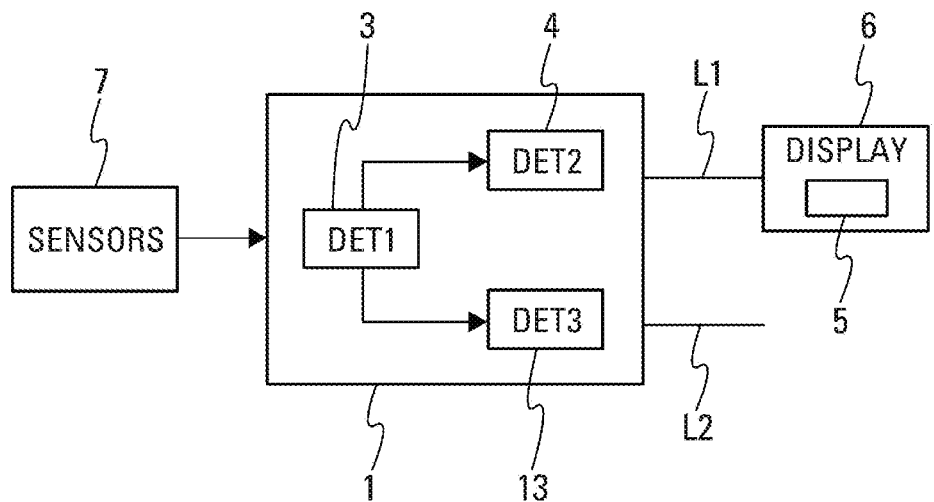
FIG. 1 is the block diagram of a particular embodiment of a piloting assistance device.

The device 1, making it possible to illustrate the disclosure herein and represented schematically in FIG. 1, is an embodiment of the device for assisting in the piloting 1 of an aircraft AC during an approach of the aircraft AC, with a view to a landing on a landing runway 2. Preferably, the approach corresponds to a guided approach ("vectored approach").

The piloting assistance device 1, embedded on the aircraft AC, can be implemented by a flight management system FMS. The system FMS can be linked in the conventional manner to a set 7 of sensors SENSORS of the aircraft AC and at least one display module DISPLAY 6 of the cockpit making it possible to display a flight plan and trajectories. These different screens can also allow a pilot, via a human-machine interface, to load a flight plan before the flight or to modify the flight plan during the flight.

The piloting assistance device 1 comprises a determination module DET1 3 configured to determine a current state of the aircraft AC. The current state of the aircraft AC is specific to a current energy state characterized by parameters. The parameters can correspond to a current position Pc of the aircraft AC, a current speed of the aircraft AC and a current configuration of the aircraft AC.

Parameters of the current state, such as the current position Pc or the current speed, can be determined from data originating from the set 7 of sensors of the aircraft AC.

As an example, the aircraft AC can be in the following configurations:
a configuration in which the aircraft AC is in flight with landing gear retracted;
a configuration in which the aircraft AC is in flight with landing gear lowered;
a configuration in which the aircraft AC is in a pre-landing configuration;
a configuration in which the aircraft AC is in a landing configuration.

The piloting assistance device 1 also comprises a determination module DET2 4 configured to determine a first distance dstd between a target state and the current state from a first approach strategy.

The first approach strategy can correspond to a standard approach strategy.

The target state corresponds to a target energy state of stabilization that the aircraft AC is assumed to have at the moment when it crosses the threshold of the landing runway 2. As for the current state of the aircraft AC, the target state is specific to a target energy state characterized by parameters including a target position PFAF of the aircraft AC, a target speed of the aircraft AC and a target configuration of the aircraft AC.

An energy state is characteristic of the energy of the aircraft AC. The energy of the aircraft AC is equal to the sum of the potential energy of the aircraft AC and of the kinetic energy of the aircraft AC.

The first distance dstd is determined as a function of an approach profile characteristic of the first approach strategy.

Figure 3A:
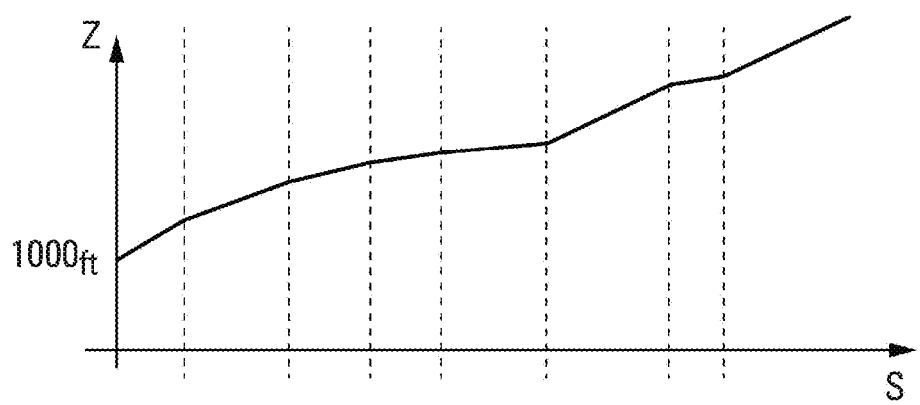
FIG. 3a is a first graph illustrating a standard approach profile.
Figure 3B:
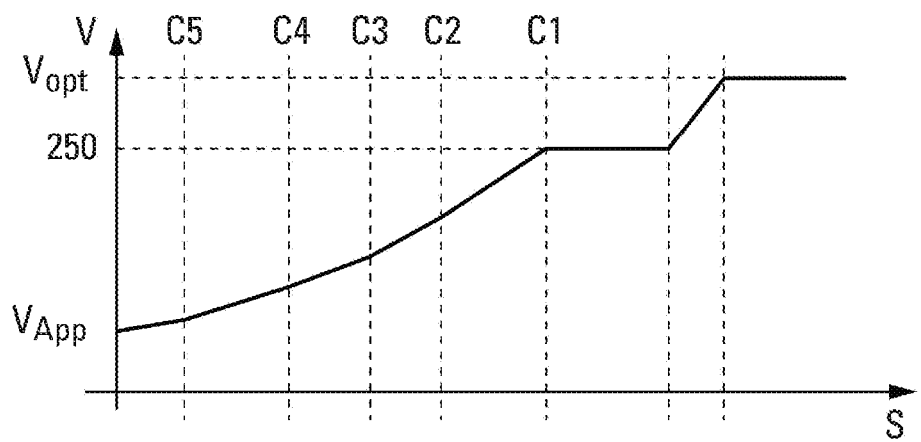
FIG. 3b is a second graph illustrating the standard approach profile.

FIGS. 3a and 3b represent a standard approach profile of an aircraft AC for a standard approach strategy. FIG. 3a represents the altitude Z that the aircraft AC should have at a distance s from the target position PFAF for it to be in accordance with the standard approach procedure. FIG. 3b represents the speed that the aircraft AC should have at a distance s from the target position PFAF for it to be in accordance with the standard approach procedure. Moreover, FIG. 3b indicates the configuration (C1, C2, C3, C4, C5) in which the aircraft AC should be at a distance s from the target position PFAF for it to be in accordance with the standard approach procedure.

This approach profile is counted down from the target state by applying a succession of predetermined strategies, the set of which forms the first approach strategy. The succession of predetermined strategies makes it possible to deduce the successive states through which the aircraft AC should pass to perform a stabilized approach "according to accepted practice". This profile, which corresponds to a fixed standard approach procedure, can be incorporated in a table to provide in real time the set of the parameters that the aircraft AC should have during a stabilized approach, as a function of any one of these parameters corresponding to the current energy state of the aircraft AC.

For example, if the aircraft AC flies at a given altitude, the table corresponding to the standard approach profile provides the other parameters that the aircraft AC should have on a standard approach profile. In particular, the table provides the first distance dstd at which the aircraft AC should be with respect to the target position PFAF, but also the speed that it should have, the aerodynamic configuration in which the aircraft AC should be.

Thus, the determination module 4 makes it possible, at each instant, for a current state of the aircraft AC, to know the first distance dstd needed by the aircraft AC for it to dissipate its energy during a standard approach.

The determination module 4 is also configured to determine a first ellipse 8 contained in a horizontal plane in which the aircraft AC is moving. The first ellipse 8 is formed by points determined in such a way that a sum, on the one hand, of a distance d1 between the current position Pc of the aircraft AC and the points of the first ellipse 8 and, on the other hand, of a distance d2 between the points of the first ellipse 8 and a projection on the horizontal plane of the target position PFAF is equal to the first distance dstd.

Figure 4:
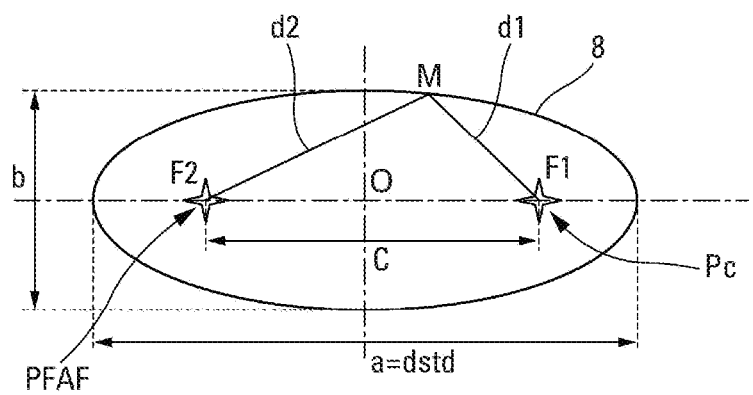
FIG. 4 represents an ellipse determined by the piloting assistance device.
Figure 5:
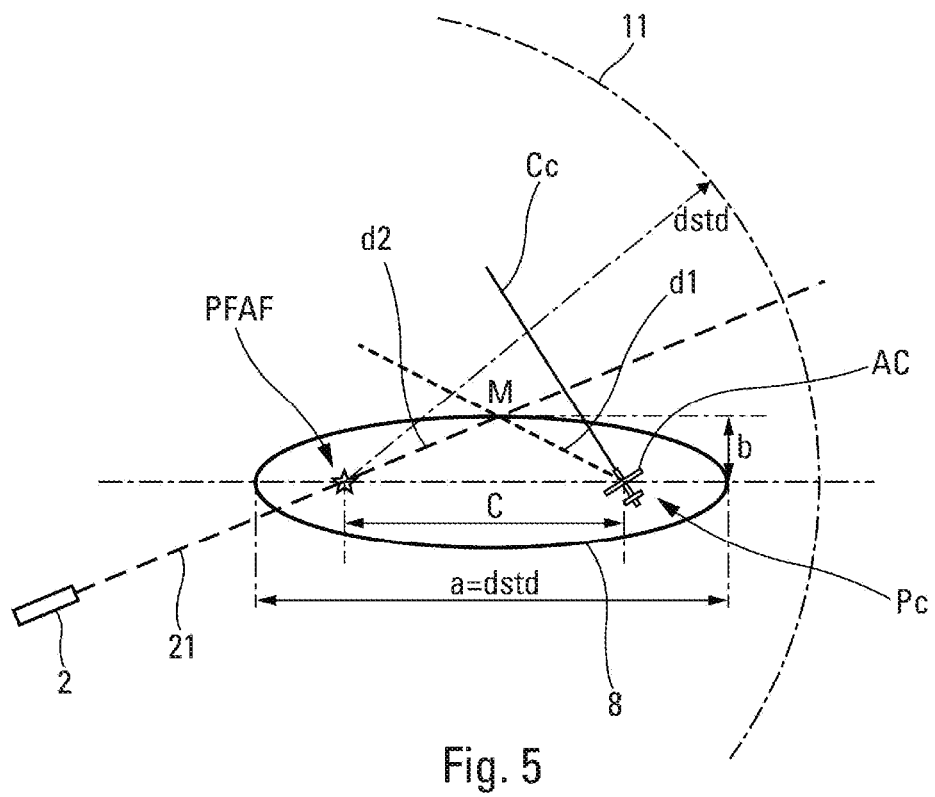
FIG. 5 represents a first diagram illustrating the determination of the ellipse according to a first current state of the aircraft.

As represented in FIG. 4 and FIG. 5, the first ellipse 8 has a focal point F1 and a focal point F2. The focal point F1 corresponds to the current position Pc of the aircraft AC. The focal point F2 corresponds to the projection of the target position PFAF on the horizontal plane. The first ellipse 8 also has a great axis a and a small axis b. The great axis a is equal to the first distance dstd.

The great axis a, the small axis b and the distance c between the two focal points F1 and F2 are linked by the following relationship:

$$b = \overrightarrow{\sqrt{a^2 - c^2}} \qquad \text{[Math 1]}$$

The piloting assistance device 1 can also comprise a display module 8 comprising a screen 5.

A signal representative of the first ellipse 8 is transmitted to the display module 6 using a link L1 in order for the first ellipse 8 to be displayed on the screen 5 of the display module 6. A link L2 can also allow the transmission of the elements determined by the determination module 4 to a user device.

The form of the first ellipse 8 makes it possible to know the significance of the energy surfeit of the aircraft AC. The energy surfeit corresponds to the excess energy that the aircraft AC has relative to the energy that it should have according to the chosen approach strategy.

It is then possible to maneuver the aircraft AC appropriately in order to dissipate the excess energy.

In the above examples, it is considered that the first strategy corresponds to a standard approach strategy.

Figure 6:
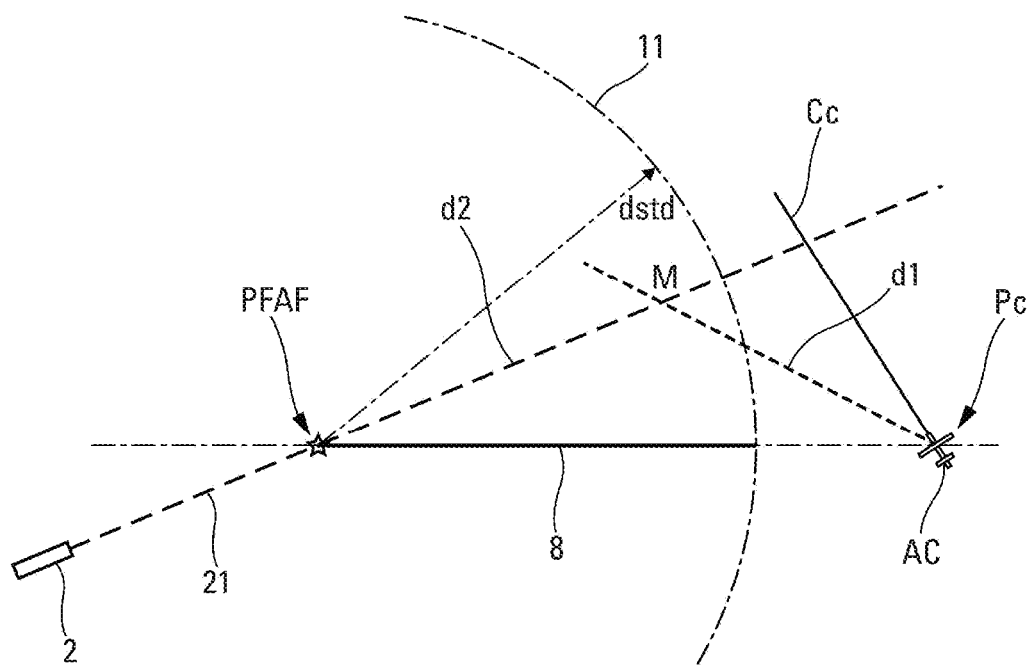
FIG. 6 represents a second diagram illustrating the determination of the ellipse according to a second current state of the aircraft.

When the distance c between the current position Pc of the aircraft AC and the projection on the horizontal plane of the target position PFAF is greater than the first distance dstd (FIG. 6), the first ellipse 8 is reduced to a segment of length equal to the first distance dstd. The direction of this segment corresponds to the straight line joining the current position Pc of the aircraft AC and the projection of the target position PFAF. A free end of this segment corresponds to the target position PFAF. If the aircraft were to take a direct trajectory to the target position PFAF, it would be under the standard profile. It would therefore be in energy deficit mode. The aircraft AC can then remain at its current altitude and follow any trajectory converging towards the axis 21 of the landing runway 2 to rejoin the standard profile below before beginning the descent to the landing runway 2.

When the distance between the current Pc of aircraft AC and the projection on the horizontal plane of the target position PFAF is less than the first distance dstd (FIG. 7), a direct trajectory towards the target position PFAF by following a standard approach procedure according to the standard strategy is no longer sufficient. The trajectory must be extended. The small axis b increases so the first ellipse 8 begins to widen even though it still remains very flat because the distance between the two focal points F1 and F2 is close to the great axis a which corresponds to the first distance dstd. The intersection M of the first ellipse 8 with the axis 21 of the landing runway 2 indicates the point that must be targeted on the axis 21 of the landing runway 2 by following the standard approach procedure to dissipate the energy appropriately.

Figure 7:
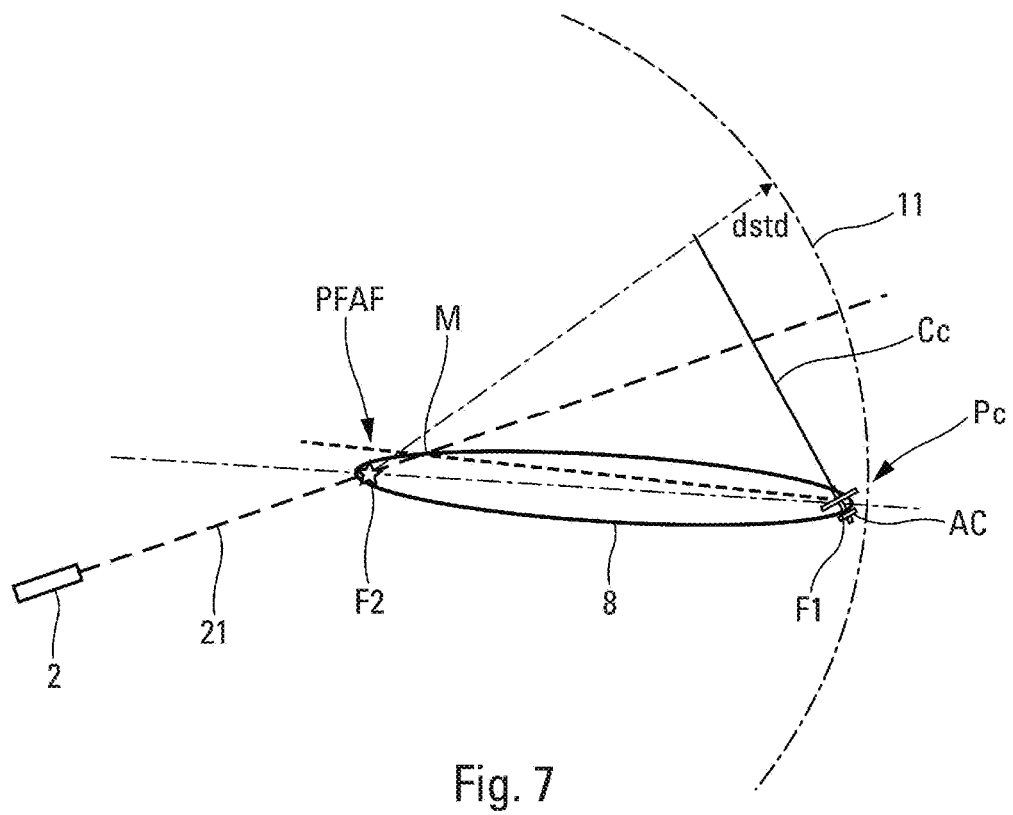
FIG. 7 represents a third diagram illustrating the determination of the ellipse according to a third current state of the aircraft.

In FIG. 7, the aircraft AC has a slight energy surfeit at the current instant.

If the aircraft AC continues to follow its current heading Cc without descending, its energy situation will be degraded because it approaches the target position PFAF without descending.

If it continues to follow its current heading Cc while descending, the first distance dstd decreasing with the altitude of the aircraft AC, its energy will vary as according to the manner in which the aircraft AC descends. Thus, if it descends according to the standard approach procedure or in a more pronounced manner than the standard approach procedure, the energy surfeit is dissipated. The circle 11 of radius equal to the first distance dstd and of centre corresponding to the projection of the target position PFAF passes between the current position Pc of the aircraft AC and the projection of the target position PFAF. If it descends in a less pronounced manner than the standard approach procedure or if it remains locked at the current altitude, its energy situation will be degraded. Indeed, if the aircraft AC does not descend, the first distance dstd does not vary even though, with the aircraft AC continuing to advance along its current heading, it approaches the target position PFAF. Therefore, the distance c between the two focal points F1 and F2 decreases and the great axis b increases. Thus, the first ellipse 8 increases in size as the energy of the aircraft AC increases by contrast with how things should be if the aircraft AC were to follow the standard approach procedure along the direct trajectory toward the target position PFAF. For example, the aircraft AC may not descend if it is locked in terms of altitude by the air traffic controller ATC.

If the aircraft AC passes vertically above the target position PFAF without losing altitude, the first ellipse 8 takes the form of a circle 11 centred on the projection of the target position PFAF and of radius equal to the first distance dstd.

If the aircraft AC begins a descent by following the standard approach procedure, the first distance dstd decreases with the altitude of the aircraft AC. At least two situations can then arise.

In a first situation, the aircraft AC is forced to follow a setpoint heading supplied by the air traffic controller ATC. This forced heading results in a lesser variation of the distance to the target position PFAF compared to a direct trajectory to the target position PFAF. The first distance dstd (the great axis a) will decrease more rapidly as the distance c between the two focal points F1 and F2 and the small axis b decreases. The first ellipse 8 contracts; this indicates to the pilot that the energy surfeit of the aircraft AC is decreasing.

In a second situation, the aircraft AC is allowed to set down by the air traffic controller ATC. If the aircraft AC takes a heading to the point of intersection between the first ellipse 8 and the axis 21 of the landing runway 2, the great axis a will decrease more than the distance C between the two focal points F1 and F2 because the aircraft AC does not follow the direct trajectory to the target position PFAF. The first ellipse 8 progressively flattens and the great axis a decreases as the aircraft AC approaches the target position PFAF. As long as the aircraft AC has not reached the target position PFAF, the first ellipse 8 is reduced to a segment [Pc, PFAF] limited, on one side, by the current position Pc of the aircraft AC and, on the other side, by the projection of the target position PFAF. When the aircraft AC reaches the target position PFAF at the standard altitude, the first ellipse 8 is reduced to a point.

Thus, the first ellipse 8 allows the pilot:

to be aware of the energy situation of the aircraft AC, in particular, to appreciate the significance of the energy surfeit of the aircraft AC with respect to the energy that is appropriate for a descent according to the standard approach procedure, to indicate the points around the aircraft AC where the aircraft AC should take a direct heading to the target position PFAF once released by the air traffic controller ATC from the current heading to which it is constrained in following the standard approach procedure to set down in good conditions, to modulate his or her rate of descent on the trajectory identified directly on the map (current heading to the first ellipse 8 then direct heading to the target position PFAF) to take up the energy surfeit of the aircraft AC: the first ellipse 8 flattens more or less rapidly as a function of the chosen rate of descent until it becomes the segment [Pc, PFAF] when the aircraft AC rejoins the standard profile.

According to a first variant embodiment, the determination module 4 is also configured to determine a point of intersection M between the first ellipse 8 and a projection of the axis 21 of the landing runway 2. A signal representative of the point of intersection is then transmitted to the display module 6 in order for the point of intersection M to be displayed on the screen 5 of the display module 6. FIGS. 4 to 7 represent the point of intersection M.

According to a second variant embodiment, a signal representative of a segment d1 between the focal point F1 and the point of intersection M and of a segment d2 between the point of intersection M and the second focal point F2 is transmitted to the display module 6 in order for the segment d1 and the segment d2 to be displayed on the screen 5 of the display module 6 (FIG. 5). This third embodiment proposes a trajectory according to the two segments d1 and d2. The pilot can validate or not validate the proposed trajectory from a human-machine interface.

According to a third variant embodiment, the determination module 4 is also configured to determine a heading setpoint from the point of intersection M. A signal representative of the heading setpoint is then transmitted to the display module 6 in order for the heading setpoint to be displayed on the screen 5 of the display module 6 on a heading scale displayed also on the screen 5 of the display module 6.

According to a fourth variant embodiment, the determination module 4 is also configured to determine a count-down corresponding to a time remaining to be travelled by the aircraft AC between its current position Pc and the point of intersection M while the aircraft AC follows the setpoint heading. A signal representative of the count-down is transmitted to the display module 6 in order for the count-down to be displayed on the screen 5 of the display module 6. The display of the count-down can be a display of a count-down in seconds. The count-down makes it possible to indicate to the pilot the moment at which to take the heading to the target position PFAF. According to a fifth variant embodiment, the determination module 4 is also configured to determine a distance to be travelled which corresponds to a remaining distance to be travelled by the aircraft AC between its current position Pc and the point of intersection M while the aircraft AC follows the heading setpoint. A signal representative of the distance to be travelled is then transmitted to the display module 6 in order for the distance to be travelled to be displayed on the screen 5 of the display module 6.

According to a sixth variant embodiment, the determination module 4 is also configured to determine a rate of descent from a relative variation of the first distance dstd (great axis a) relative to the distance between the current position Pc and the target position PFAF (distance c between the first focal point F1 and the second focal point F2). This relative variation therefore has the expression: $(a-c)/c$. A signal representative of the rate of descent is then transmitted to the display module 6 in order for the rate of descent to be displayed on the screen 5 of the display module 6 on a vertical speed scale displayed also on the screen 5 of the display module 6.

Figure 8:
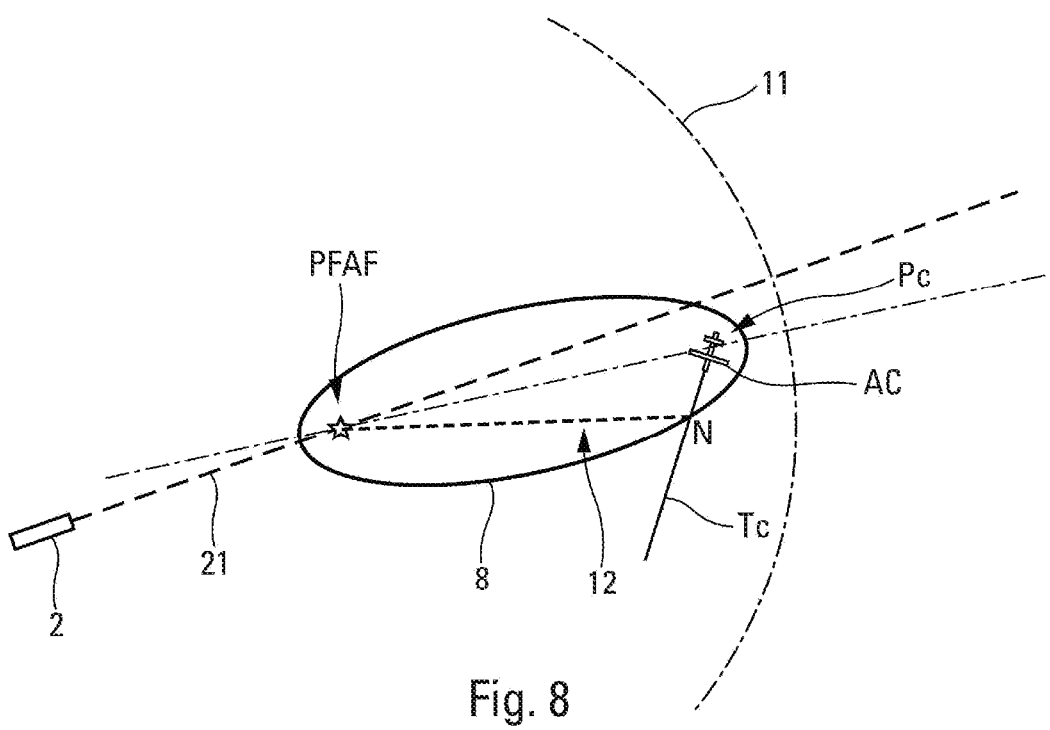
FIG. 8 represents a fourth diagram illustrating the determination of the ellipse according to a fourth current state of the aircraft.

According to a seventh variant embodiment (FIG. 8), the determination module 4 is also configured to determine an optimal rejoining trajectory 12 to the target position Pc if the aircraft AC has a current trajectory Tc which diverges from the axis 21 of the landing runway 2. The optimal rejoining trajectory 12 has a distance equal to the first distance dstd. Furthermore, the optimal rejoining trajectory 12 passes through a point of intersection N between the first ellipse 8 and the current trajectory Tc. A signal representative of the optimal rejoining trajectory 12 is then transmitted to the display module 6 in order for the optimal rejoining trajectory 12 to be displayed on the screen 5 of the display module 6.

According to an eighth variant embodiment, the piloting assistance device 1 comprises a determination module 13 configured to determine a second distance between the target state and the current state from a second approach strategy. The determination module 13 is also configured to determine a second ellipse contained in the horizontal plane in which the aircraft AC is moving. The second ellipse is formed by points determined in such a way that a sum, on the one hand, of a distance between the current position Pc of the aircraft and the points of the second ellipse and, on the other hand, of a distance between the points of the second ellipse and a projection on the horizontal plane of the target position PFAF is equal to the second distance. A signal representative of the second ellipse is then transmitted to the display module 6 in order for the second ellipse to be displayed on the screen 5 of the display module 6. The second approach strategy can correspond to a limit approach strategy.

In particular, the second strategy makes it possible to give the crew information on the point not to be exceeded and the corresponding trajectory from the current position Pc of the aircraft AC to avoid having to go around, since the residual energy of the aircraft AC could not be dissipated to the target position PFAF.

According to a ninth variant embodiment, the determination module 4 is also configured to determine an energy surfeit of the aircraft AC with respect to a predicted energy according to the first strategy. The energy surfeit can be determined as a function of the dimension of the small axis b of the ellipse 8. The greater the smaller axis b, the greater the energy surfeit. An energy gauge can then be determined in order to represent a tank that is more or less full according to a quantity of energy surfeit. The greater the quantity of the energy surfeit, the more full is the tank of the energy gauge. A signal representative of the energy gauge is transmitted to the display module 6 in order for the energy gauge to be displayed on the screen 5 of the display module 6.

According to a tenth variant embodiment, the determination module 4 is also configured to determine an energy surfeit of the aircraft AC relative to a predicted energy according to the first strategy. As for the ninth variant embodiment, the energy surfeit can be determined as a function of the dimension of the small axis b of the ellipse 8. A numeric indication representative of the energy surfeit being determined from the energy surfeit. For example, the numeric indication is equal to "0" if the energy dissipation is done in accordance with the first strategy. The numeric indication is equal to "1" if the energy dissipation is performed according to a limit descent procedure. The numeric indication can be equal to a value between "0" and "1" if the energy dissipation is performed according to a descent procedure between the first strategy and the limit descent procedure. A signal representative of the numeric indication is transmitted to the display module 6 in order for the numeric indication to be displayed on the screen 5 of the display module 6.

Figure 2:
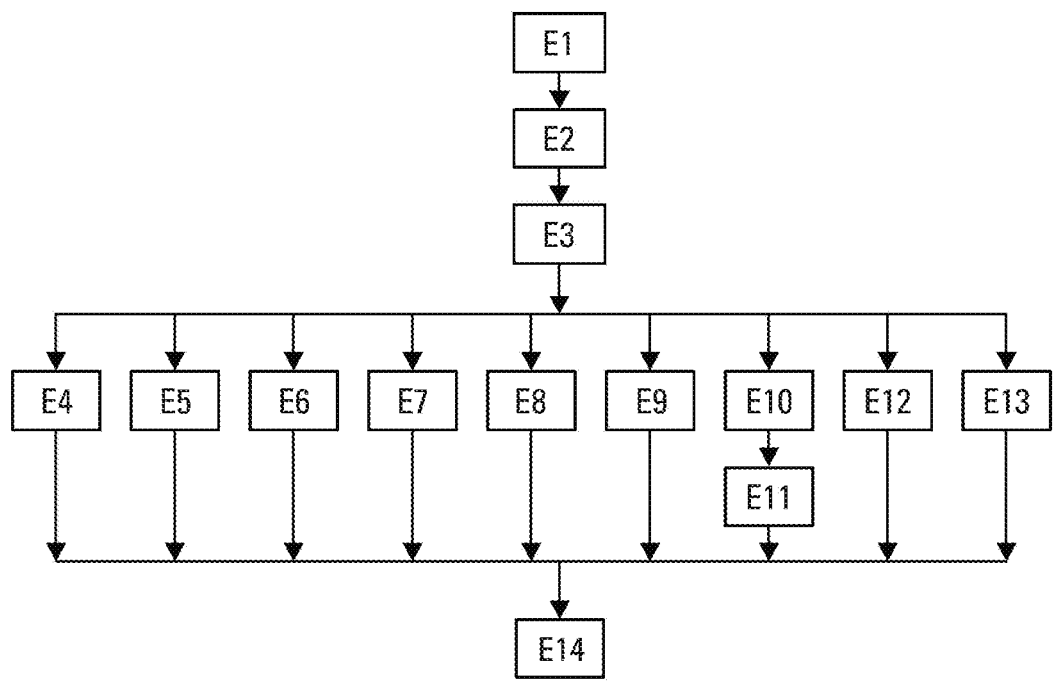
FIG. 2 is the block diagram of a particular embodiment of a piloting assistance method.

The disclosure herein relates also to a method for assisting in the piloting of an aircraft AC during an approach of the aircraft AC, with a view to a landing on a landing runway 2 (FIG. 2).

The piloting assistance method comprises the following steps implemented iteratively:

a determination step E1, implemented by the determination module 3, consisting in or comprising determining a current state of the aircraft AC, the current state comprising at least one current position Pc of the aircraft AC;

a determination step E2, implemented by the determination module 4, consisting in or comprising determining a first distance dstd between a target state and the current state from the first approach strategy;

a determination step E3, implemented by the determination module 4, consisting in or comprising determining the first ellipse 8 contained in a horizontal plane in which the aircraft AC is moving, the first ellipse 8 being formed by points determined in such a way that a sum, on the one hand, of a distance d1 between the current position Pc of the aircraft AC and the points of the first ellipse 8 and, on the other hand, of a distance d2 between the points of the first ellipse 8 and a projection on the horizontal plane of the target position PFAF is equal to the first distance dstd;

a display step E14, implemented by the display module 6, comprising the display of at least the first ellipse 8 on the screen 5 of the display module 6.

The display step E14 can also comprise the display of the first focal point F1 and of the second focal point F2 of the first ellipse 8.

According to the first variant embodiment, the piloting assistance method comprises a determination step E4, implemented by the determination module 4, consisting in or comprising determining the point of intersection M between the first ellipse 8 and the projection of the axis 21 of the landing runway 2. The display step E14 also comprises the display of the point of intersection M on the screen 5 of the display module 6.

According to the second variant embodiment, the display step E14 also comprises the display of the first segment between the focal point F1 and the point of intersection M and of the second segment between the point of intersection M and the second focal point F2.

According to the third variant embodiment, the piloting assistance method can comprise a determination step E5, implemented by the determination module 4, consisting in or comprising determining a heading setpoint from the point of intersection M. The display step E14 then comprises the display of the heading setpoint on a heading scale.

According to the fourth variant embodiment, the piloting assistance method comprises a determination step E6, implemented by the determination module 4, consisting in or comprising determining a count-down corresponding to a time remaining to be travelled by the aircraft AC between the current position Pc of the aircraft AC and the point of intersection M while the aircraft AC follows the heading setpoint. The display step E14 then comprises the display of the count-down.

According to the fifth variant embodiment, the piloting assistance method comprises a determination step E7, implemented by the determination module 4, consisting in or comprising determining a distance corresponding to a distance remaining to be travelled by the aircraft AC between the current position Pc of the aircraft AC and the point of intersection M while the aircraft AC follows the heading setpoint. The display step E14 then comprises the display of the distance to be travelled.

According to the sixth variant embodiment, the piloting assistance method comprises a determination step E8, implemented by the determination module 4, consisting in or comprising determining a rate of descent from the first position dstd relative to the distance between the current position Pc and the target position PFAF. The display step E14 then comprises the display of the rate of descent on a vertical speed scale.

According to the seventh variant embodiment, the piloting assistance method comprises a determination step E9, implemented by the determination module 4, consisting in or comprising determining the optimal rejoining trajectory 12 to the target position Pc if the aircraft AC has a current trajectory Tc which diverges from the axis 21 of the landing runway 2. The display step E14 then comprises the display of the optimal rejoining trajectory 12.

According to the eighth variant embodiment, the piloting assistance method also comprises:

a determination step E10, implemented by a determination module 13, consisting in or comprising determining the second distance between the target state and the current state from the second approach strategy;

a determination step E11, implemented by the determination module 13, consisting in or comprising determining the second ellipse contained in the horizontal plane in which the aircraft AC is moving.

The display step E14 then comprises the display of the second ellipse.

According to the ninth variant embodiment, the piloting assistance method comprises a determination step E12, implemented by the determination module 4, consisting in or comprising determining the energy surfeit of the aircraft AC relative to an energy dissipation according to the first strategy. The energy gauge can then be determined. The display step E14 then comprises the display of the energy gauge.

According to the tenth variant embodiment, the piloting assistance method comprises a determination step E13, implemented by the determination module 4, consisting in or comprising determining the energy surfeit of the aircraft AC relative to a dissipation of the energy according to the first strategy. The energy surfeit is determined as a function of the dimension of the small axis b of the ellipse 8. The numeric indication representative of the energy surfeit is determined from the energy surfeit. The display step E14 then comprises the display of the numeric indication.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assisting in piloting of an aircraft in an approach of the aircraft, with a view to a landing on a landing runway, the method, being implemented by a piloting assistance device, comprising one or more processors and located onboard the aircraft, the method comprising:
determining, by a first determination module comprising one or more processors, a current energy state of the aircraft, the current energy state comprising at least one current position of the aircraft;
determining, by a second determination module comprising one or more processors, a first distance between a target position and the current position from a first approach strategy, the target position being linked to a target energy state of the aircraft;
determining, by the second determination module, a first ellipse contained in a horizontal plane in which the aircraft is moving, the first ellipse being formed by points determined such that a sum of a distance between the current position of the aircraft and the points of the first ellipse and of a distance between the points of the first ellipse and a projection on the horizontal plane of the target position is equal to the first distance; and
displaying at least the first ellipse on a screen of a display module.

2. The method according to claim 1, wherein the first ellipse has a first focal point and a second focal point, the first focal point corresponding to the current position of the aircraft and the second focal point corresponding to the projection of the target position on the horizontal plane, the first ellipse having also a great axis and a small axis, the great axis being equal to the first distance; and
the method further comprising displaying the first focal point and of the second focal point.

3. The method according to claim 1, further comprising:
determining, by the second determination module, a point of intersection between the first ellipse and a projection of an axis of the landing runway; and
displaying the point of intersection on the screen of the display module.

4. The method according to claim 1, comprising displaying a first segment between the first focal point and the point of intersection and of a second segment between the point of intersection and the second focal point.

5. The method according to claim 1, further comprising:
determining, by the second determination module, a heading setpoint from the point of intersection; and
displaying the heading setpoint on a heading scale.

6. The method according to claim 5, further comprising:
determining, by the second determination module, a count-down corresponding to a time remaining to be travelled by the aircraft between the current position of the aircraft and the point of intersection while the aircraft follows the heading setpoint; and
displaying the count-down.

7. The method according to claim 5, further comprising:
determining, by the second determination module, a distance corresponding to a distance remaining to be travelled by the aircraft between the current position of the aircraft and the point of intersection while aircraft follows the heading setpoint; and
displaying the distance to be travelled.

8. The method according to claim 1, further comprising:
determining, by the second determination module, a rate of descent from a relative variation of the first distance with respect to the distance between the current position and the target position;
displaying the rate of descent on a vertical speed scale.

9. The method according to claim 1, further comprising:
determining, by the second determination module, an optimal rejoining trajectory towards the target position if the aircraft has a current trajectory which diverges from an axis of the landing runway, the optimal rejoining trajectory having a distance equal to the first distance, the optimal rejoining trajectory passing through a point of intersection between the first ellipse and the current trajectory;
displaying the optimal rejoining trajectory.

10. The method according to claim 1, further comprising:
determining, by a third determination module comprising one or more processors, comprising determining a second distance between the target state and the current state based on a second approach strategy;
determining, by the third determination module, a second ellipse contained in the horizontal plane in which the aircraft is moving, the second ellipse being formed by points determined such that a sum of a distance between the current position of the aircraft and the points of the second ellipse and of a distance between the points of the second ellipse and a projection on the horizontal plane of the target position is equal to the second distance; and
displaying the second ellipse.

11. The method according to claim 1, further comprising:
determining, by the second determination module, an energy surfeit of the aircraft with respect to a predicted energy according to the first approach strategy, the energy surfeit being determined as a function of a dimension of the small axis of the ellipse, an energy gauge being determined from the energy surfeit;
displaying the energy gauge.

12. The method according to claim 1, further comprising:
determining, by the second determination module, an energy surfeit of the aircraft with respect to a predicted energy according to the first approach strategy, the energy surfeit being determined as a function of a dimension of the small axis of the ellipse, a numeric indication representative of the energy surfeit being determined from the energy surfeit; and
displaying the numeric indication.

13. A device for assisting in piloting of an aircraft and for assisting in landing the aircraft on a landing runway, the device comprising:
a first determination module comprising one or more processors and configured to determine a current energy state of the aircraft, the current energy state comprising at least one current position of the aircraft;
a second determination module comprising one or more processors and configured to:
determine a first distance between a target position and the current position from a first approach strategy, the target position being linked to a target energy state of the aircraft; and
determine a first ellipse contained in a horizontal plane in which the aircraft is moving, the first ellipse being formed by points determined such that a sum of a distance between the current position of the aircraft and the points of the first ellipse and of a distance between the points of the first ellipse and a projection on the horizontal plane of the target position is equal to the first distance; and a display module comprising a screen, the display module being configured to display at least the first ellipse on the screen.

14. The device according to claim 13, wherein the second determination module is further configured to determine a point of intersection between the first ellipse and a projection of an axis of the landing runway.

15. An aircraft, comprising a device for assisting in piloting of an aircraft according to claim 13.

* * * * *